(No Model.)

W. GLEDHILL.
NUT LOCK.

No. 506,490. Patented Oct. 10, 1893.

WITNESSES:
P. F. Fragle.
L. Douville.

INVENTOR
Walter Gledhill
BY John A. Niederroheim
ATTORNEY.

UNITED STATES PATENT OFFICE.

WALTER GLEDHILL, OF CLIFTON, PENNSYLVANIA, ASSIGNOR OF FIVE-EIGHTHS TO JAMES SMETHURST, OF ST. HELEN'S, ENGLAND, AND JOHN F. BUCKLEY, JOSEPH HAINES, DAVIS W. JOHN, AND WILLIAM J. DOUGHERTY, OF PHILADELPHIA, PENNSYLVANIA.

NUT-LOCK.

SPECIFICATION forming part of Letters Patent No. 506,490, dated October 10, 1893.

Application filed January 5, 1893. Serial No. 457,309. (No model.)

*To all whom it may concern:*

Be it known that I, WALTER GLEDHILL, a citizen of the United States, residing at Clifton, in the county of Delaware, State of Pennsylvania, have invented a new and useful Improvement in Nut Locks or Fasteners, which improvement is fully set forth in the following specification and accompanying drawings.

My invention consists of a nut lock or fastener having dogs which are adapted to engage with different depressions in the nut to be secured, whereby the latter-named nut may be locked or fastened by the former at places close to each other.

Figure 1:
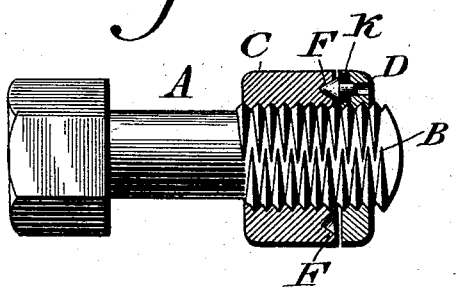
Figure 2:
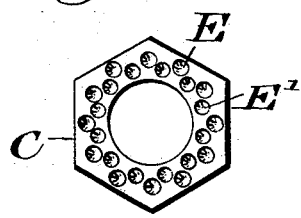
Figure 3:
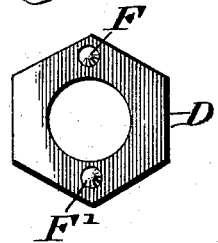
Figure 4:
Figure 5:
Figure 6:
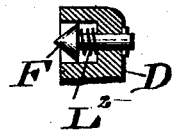

Figure 1 represents a section of a nut lock or fastener embodying my invention, the same being in position on a bolt and engaging the nut to be controlled. Figs. 2 and 3 represent face views of the nuts employed. Figs. 4, 5, and 6 show different forms of springs employed for actuating the dogs of the fastening nut.

Similar letters of reference indicate corresponding parts in the several figures.

Referring to the drawings: A designates a bolt having right and left screw threads thereon.

C designates the nut to be locked or fastened, and D designates the nut which locks or fastens the same. In the inner face of the nut C, is a circular row of depressions E, with either of which engages the dog F, which consists of a point G, the shoulder H, and stem J. In the nut D is a counter-sunk recess K, the wide portion of which receives an annular cushion L, in the center of which is snugly fitted the stem J of the dog, a portion of said stem also closely entering the narrow part of the recess K, and is adapted to play therein.

The head of the dog F is guided by the walls of the recess K, so that the further guidance of the stem in the inner recess in which it closely fits, forms a firm bearing for said dog, preventing any lateral motion in its bearings. The shoulder H bears against the outer face of the cushion L, and compresses the latter when the dog is forced back, and is in turn forced out by said cushion as a spring, when the point of the dog enters either of the openings E of the nut C. It will be seen that when the nut C is in position, the nut D is screwed up toward the same. The dog moves in and out as it rides over the depressions, and portions of the face of the nut C between the same, and when said nut D is home the dog remains in the depression in which it seats itself, so that both nuts are locked or fastened in a reliable manner, it requiring superior force to unscrew the nut D. It will also be seen that before the nut D is applied to the bolt, the cushion L hugs the stem J so firmly, and said cushion likewise hugs the wall of the counter-sunk recess, that both dog and cushion are held firmly in the recess without liability to be lost, and the nut D is always ready for the locking or fastening action on the nut C.

In order to cause the nut to be locked at places or points close to each other, I employ another row of depressions as at E', in the nut C, and another dog F' in the nut D, it being noticed that the depressions of one row alternate with those of the other row, the dogs F, F', being so located that they engage with the respective rows.

In Fig. 4 the cushion L is of the form of a rubber annulus. In Figs. 5 and 6 there are shown a plate spring L' and coiled spring L² in lieu of said cushion L.

The present construction is designed as an improvement on that shown in the Letters Patent No. 448,183, granted to me on the 10th day of March, 1891.

Having thus described my invention, what I claim as new, and desire to secure by Letters Patent, is—

A nut having rows of depressions on its face, the depressions of one row alternating with those of another row, and a nut provided with dogs which respectively engage with said rows.

WALTER GLEDHILL.

Witnesses:
JOHN A. WIEDERSHEIM,
A. P. JENNINGS.